(12) United States Patent
Zha

(10) Patent No.: US 9,938,446 B2
(45) Date of Patent: Apr. 10, 2018

(54) WELLBORE SERVICE FLUID

(71) Applicant: HALLIBURTON ENERGY SERVICES, INC., Houston, TX (US)

(72) Inventor: Weibin Zha, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/102,383

(22) PCT Filed: Jan. 7, 2014

(86) PCT No.: PCT/US2014/010417
§ 371 (c)(1),
(2) Date: Jun. 7, 2016

(87) PCT Pub. No.: WO2015/105477
PCT Pub. Date: Jul. 16, 2015

(65) Prior Publication Data
US 2016/0304763 A1  Oct. 20, 2016

(51) Int. Cl.
| | |
|---|---|
| *C09K 8/035* | (2006.01) |
| *C09K 8/32* | (2006.01) |
| *C08F 257/02* | (2006.01) |
| *C09K 8/502* | (2006.01) |
| *C08F 287/00* | (2006.01) |
| *C08L 91/00* | (2006.01) |

(52) U.S. Cl.
CPC ............ *C09K 8/035* (2013.01); *C08F 257/02* (2013.01); *C08F 287/00* (2013.01); *C09K 8/32* (2013.01); *C09K 8/502* (2013.01); *C08L 91/00* (2013.01)

(58) Field of Classification Search
None
See application file for complete search history.

(56) References Cited

U.S. PATENT DOCUMENTS

| | | | |
|---|---|---|---|
| 3,910,856 A | 10/1975 | Kruka et al. | |
| 5,883,054 A | 3/1999 | Hernandez et al. | |
| 6,017,854 A | 1/2000 | Van Slyke | |
| 7,741,250 B2 | 6/2010 | Patel | |
| 2006/0078682 A1* | 4/2006 | McDaniel | C09K 3/1436 427/372.2 |
| 2010/0000795 A1* | 1/2010 | Kakadjian | C09K 8/38 175/69 |
| 2012/0052225 A1 | 3/2012 | Kani et al. | |
| 2013/0306306 A1 | 11/2013 | Korte et al. | |

OTHER PUBLICATIONS

Copenheaver, PCT Search Report for PCT Application No. PCT/US2014/010417 dated Apr. 24, 2014.
Copenheaver, PCT Written Opinion for PCT Application No. PCT/US2014/010417 dated Apr. 24, 2014.

* cited by examiner

*Primary Examiner* — John J Figueroa
(74) *Attorney, Agent, or Firm* — Locke Lord LLP

(57) ABSTRACT

A wellbore fluid and method of use including grafted block copolymer, wherein the grafted block copolymer comprises at least one poly(vinylaromatic) segment and at least one elastomeric segment. The elastomeric segment can be a polymer from conjugated diene monomers having 4-6 carbons atoms per molecule. The poly(vinylaromatic) segment can be a monovinyl aromatic polysegment. The block copolymers can be a hydrogenated poly(styrene-b-isoprene) (SEP), a hydrogenated poly(styrene-b-butadiene) (SEB), a hydrogenated poly(styrene-b-isoprene/butadiene) (SEEP), a hydrogenated poly(styrene-b-isoprene-b-styrene) (SEPS), a hydrogenated poly(styrene-b-butadiene-b-styrene) (SEBS), or a hydrogenated poly(styrene-b-isoprene/butadiene-b-styrene) (SEEPS).

20 Claims, No Drawings

WELLBORE SERVICE FLUID

FIELD OF INVENTION

The embodiments disclosed herein relate generally to methods and compositions for fluid loss control additives and viscosifier for oil-based wellbore service fluids in oilfield applications.

BACKGROUND OF INVENTION

Drilling fluids are used while drilling bore holes in subterranean formations. Oil-based drilling fluids are used for recovering oil as well as gas. However, commercially available drilling fluids have limited thermal stability and are known to exhibit a decrease in fluid loss control after being exposed to high temperatures.

Wellbore service fluids including maleic anhydride grafted alpha-olefin homopolymer combined with neat poly(styrene-b-ethylene/butylene-b-styrene) (SEBS) block copolymers have been used in oilfield applications to address this problem.

The present invention addresses this by using a grafted SEBS block copolymer to obtain fluid loss control instead of the combination of grafted homopolymer and SEBS. SEBS has better soluability than alpha-olefin homopolymer in oil and it has a high temperature stability attributes due to the lack of an unstable double bond.

DETAILED DESCRIPTION OF DISCLOSED EMBODIMENTS

As an initial matter, it will be appreciated that the development of an actual, real commercial application incorporating aspects of the disclosed embodiments will require many implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time.

While a developer's efforts might be complex and time-consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

A block copolymer is a copolymer formed when the two or more monomers cluster together and form 'blocks' of repeating units. The most common di-block copolymers have a poly(vinylaromatic) segment such as styrene at one end of the molecule, and an elastomeric segment such as a conjugated diene at another end of the block polymer.

The most common tri-block copolymers have a poly(vinylaromatic) segment such as styrene at the ends of the molecule, and an elastomeric segment such as a conjugated diene in the center of the block polymer. After polymerization, the conjugated dienes still have one double bond left that can be hydrogenated.

A wellbore fluid and method of use including grafted block copolymer, wherein the grafted block copolymer comprises at least one poly(vinylaromatic) segment and at least one elastomeric segment. The elastomeric segment can be a polymer from conjugated diene monomers having 4-6 carbons atoms per molecule, such as 1,3-butadiene, isoprene, 2-ethyl-1,3-butaiene, 2,3-dimethy-1,3-butadiene, or piperylene.

The poly(vinylaromatic) segment can be a monovinyl aromatic polysegment, such as styrene, α-metylstyrene, p-vinyltoluene, m-vinyltoluene, o-vinyltoluene, 4-ethylstyrene, 3-ethylstyrene, 2-ethylstyrene, 4-tert-butystyrene, or 2,4-dimethylstyrene. The block copolymers can be a hydrogenated poly(styrene-b-isoprene) (SEP), a hydrogenated poly(styrene-b-butadiene) (SEB), a hydrogenated poly(styrene-b-isoprene/butadiene) (SEEP), a hydrogenated poly(styrene-b-isoprene-b-styrene) (SEPS), a hydrogenated poly(styrene-b-butadiene-b-styrene) (SEBS), or a hydrogenated poly(styrene-b-isoprene/butadiene-b-styrene) (SEEPS).

Styrene ethylene butylene styrene (SEBS) block copolymer is a block copolymer hydrogenated from a tri-block copolymer poly(styrene-b-butadiene-b-styrene) (SBS). SEB block copolymer is a block copolymer hydrogenated from a di-block copolymer poly(styrene-b-butadiene) (SB). In a preferred embodiment, the grafted block copolymer includes an aromatic block and wherein the aromatic block is about 10 wt. % to about 90 wt. % of the wellbore fluid.

The block copolymer can be further functionalized by at least one grafted amine group, at least one grafted carboxyl group, at least one grafted vinylsilane, and/or at least one grafted maleic anhydride. In a preferred embodiment, the grafted maleic anhydride is from about 0.1 wt. % to about 5.0 wt. % of the wellbore fluid.

This present invention describes using just grafted block copolymer instead of the combination of grafted homopolymer and SEBS. The most common block copolymers can be used are SEBS, SEPS, and SEEPS wherein EP is hydrogenated polyisoprene, EB is hydrogenated polybutadiene, and EEP is hydrogenated poly(isoprene/dutadiene).

The following are the most common block copolymers that can be used.

Compound 1

SEPS

Compound 2

Random copolymer block

SEBS

Compound 3

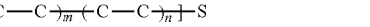

Random copolymer block

SEEPS

This relates to a hydrogenated poly(styrene-b-isoprene) (SEP), a hydrogenated poly(styrene-b-butadiene) (SEB), a hydrogenated poly(styrene-b-isoprene/butadiene) (SEEP), a hydrogenated poly(styrene-b-isoprene-b-styrene)(SEPS), a hydrogenated poly(styrene-b-butadiene-b-styrene) (SEBS), and a hydrogenated poly(styrene-b-isoprene/butadiene-b-styrene) (SEEPS).

Other block copolymers may be used can be synthesized with conjugated diene monomers having 4-6 carbons atoms per molecule such as 1,3-butadiene, isoprene, 2-ethyl-1,3-butadiene, 2,3-dimethy-1,3-butadiene and piperylene and vinylaromatic monomers such are styrene, α-metylstyrene, p-vinyltoluene, m-vinyltoluene, o-vinyltoluene, 4-ethylstyrene, 3-ethylstyrene, 2-ethylstyrene, 4-tert-butystyrene and 2,4-dimethylstyrene.

The block length ratio or the weight ratio of each block in the polymer is a molecular parameter that controls the performance of the polymer. In this invention, the weight percentage of aromatic block can be about 10 wt. % to about 90 wt. % more preferably about 20 wt. % to about 80 wt. %, most preferably about 30 wt. % to about 70 wt. %.

The hydrogenated block copolymers can be further functionalized by attaching functional groups/monomers to the main chain. Using SEBS as an example, the most common functionalization include maleic anhydride grafted SEBS (SEBS-g-MA), amine group grafted SEBS (SEBS-g-NH2), carboxyl group grafted SEBS (SEBS-g-COOH), and vinylsilanes grafted SEBS.

The maleic anhydride may be grafted to an amount of from about 0.1 wt. % to about 5.0 wt. %, preferably from about 0.2 wt. % to about 4.0 wt. %, most preferably from about 0.3 wt. % to about 3.0 wt. % based on total weight of SEBS triblock copolymer.

The grafted block copolymer may be present in the wellbore service fluid in amounts of from about 0.1 wt. % to about 5.0 wt. %, preferably from about 0.2% wt. % to about 4.0 wt. %, most preferably from about 0.3 wt. % to about 3.0 wt. % based on the total weight of the wellbore service fluid.

EXAMPLES

The following are meant to illustrate, not limit, the invention. Examples 1-3 demonstrate oil based mud formulation and performance.

Examples 1-3

In Examples 1-3, KRATON FG 1901 is a SEBS-g-MA. When 1 lb. of Kraton FG 1901 is added to the formulation, high pressure/high temperature (HPHT) (for example, 250° F./500 psi) fluid loss is reduced from about 7.6 ml to about 3.6 ml. When 1 lb. of BDF-513, which is a fluid loss control additive, is replaced with Kraton FG 1901, HPHT fluid loss is reduced from about 7.6 ml to about 5.2 ml. The addition of Kraton FG 1901 increases the high shear viscosity. Accordingly, the invention is a good viscosifier in oil based wellbore service fluids.

TABLE 1

|  | Example 1 | Example 2 | Example 3 |
|---|---|---|---|
| OWR | 90/10 | 90/10 | 90/10 |
| Base oil, bbl | 0.53 (150.7 g) | 0.52 (149.3 g) | 0.53 (150.7 g) |
| EZ MUL NT, lb | 16 | 16 | 16 |
| Lime, lb | 4 | 4 | 4 |
| CaCl$_2$ Brine (150k ppm), bbl | 0.06 (3.7 g CaC12 and 20.4 g) Water | 0.06 (3.7 g CaC12 and 20.3 g) Water | 0.06 (3.7 g CaC12 and 20.4 g) Water |
| BDF-513, lb | 6 | 5 | 6 |
| BARACARB, lb | 15 | 15 | 15 |
| TAU-MOD, lb | 5 | 5 | 5 |
| BDF-568, lb | 1 | 1 | 0 |
| Kraton FG1901 |  | 1 | 1 |
| Weighting agent, lb | 471.2 g | 470.7 g | 471.2 g |
| Rolled, hrs 150° F. | 16 | 16 | 16 |
| 600 rpm | 82 | 106 | 122 |
| 300 rpm | 47 | 60 | 70 |
| 200 rpm | 35 | 43 | 51 |
| 100 rpm | 22 | 25 | 30 |
| 6 rpm | 5 | 4 | 6 |
| 3 rpm | 4 | 3 | 4 |
| 10 Sec gel, lb/100 ft$^2$ | 8 | 5 | 6 |
| 10 Min gel, lb/100 ft$^2$ | 19 | 6 | 8 |
| 30 Min gel, lb/100 ft$^2$ | 24 | 8 | 8 |
| HPHT fluid loss mL | 7.6 | 5.2 | 3.6 |

Therefore, the present embodiments are well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein.

Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention.

The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

While the disclosed embodiments have been described with reference to one or more particular implementations, those skilled in the art will recognize that many changes may be made thereto without departing from the spirit and scope of the description. Accordingly, each of these embodiments and obvious variations thereof is contemplated as falling within the spirit and scope of the claimed invention, which is set forth in the following claims.

What is claimed is:

1. A wellbore fluid comprising:
a grafted block copolymer, wherein the grafted block copolymer comprises at least one poly(vinylaromatic) segment, at least one elastomeric segment, and at least one grafted functional group.

2. The wellbore fluid of claim 1, wherein the elastomeric segment is a polymer from conjugated diene monomers having 4-6 carbons atoms per molecule.

3. The wellbore fluid of claim 2, wherein the conjugated diene monomers are selected from a group consisting of 1,3-butadiene, isoprene, 2-ethyl-1,3-butaiene, 2,3-dimethy-1,3-butadiene, and piperylene.

4. The wellbore fluid of claim 1, wherein the poly (vinylaromatic) segment is a monovinyl aromatic polysegment.

5. The wellbore fluid of claim 4, wherein the monovinyl aromatic polysegment is selected from a group consisting of styrene, a-metylstyrene, p-vinyltoluene, m-vinyltoluene, o-vinyltoluene, 4-ethyl styrene, 3-ethyl styrene, 2-ethyl styrene, 4-tert-butystyrene, and 2,4-dimethylstyrene.

6. The wellbore fluid of claim 1 wherein the block copolymers are selected from a group consisting of a hydrogenated poly(styrene-b-isoprene) (SEP), a hydrogenated poly(styrene-b-butadiene) (SEB), a hydrogenated poly(styrene-b-isoprene/butadiene) (SEEP), a hydrogenated poly (styrene-b-isoprene-b-styrene) (SEPS), a hydrogenated poly (styrene-b-butadiene-b-styrene) (SEBS), and a hydrogenated poly(styrene-b-isoprene/butadiene-b-styrene) (SEEPS).

7. The wellbore fluid of claim 1, wherein the grafted block copolymer is SEBS hydrogenated from a tri-block copolymer poly(styrene-b-butadiene-b-styrene) (SBS).

8. The wellbore fluid of claim 1, wherein the grafted block copolymer comprises an aromatic block and wherein the aromatic block is about 10 wt. % to about 90 wt. % of the wellbore fluid.

9. The wellbore fluid of claim 1, further comprising at least one grafted amine group.

10. The wellbore fluid of claim 1, further comprising at least one grafted carboxyl group.

11. The wellbore fluid of claim 1, further comprising at least one grafted vinylsilane.

12. The wellbore fluid of claim 1, further comprising at least one grafted maleic anhydride.

13. The wellbore fluid of claim 12, wherein the grafted maleic anhydride is from about 0.1 wt. % to about 5.0 wt. % of the wellbore fluid.

14. A wellbore fluid comprising:
a grafted block copolymer, wherein the grafted block copolymer comprises at least one poly(vinylaromatic) segment, at least one elastomeric segment, and at least one grafted monomer selected from the group consisting of an amine group, a carboxyl group, a vinylsilane group, and a maleic anhydride group.

15. A method, comprising adding a grafted block copolymer to a wellbore fluid, wherein the grafted block copolymer comprises at least one poly(vinylaromatic) segment, at least one elastomeric segment, and at least one grafted functional group.

16. The method of claim 15, wherein grafted block copolymers are selected from a group consisting of a hydrogenated poly(styrene-b-isoprene) (SEP), a hydrogenated poly(styrene-b-butadiene) (SEB), a hydrogenated poly(styrene-b-isoprene/butadiene) (SEEP), a hydrogenated poly (styrene-b-isoprene-b-styrene) (SEPS), a hydrogenated poly (styrene-b-butadiene-b-styrene) (SEBS), and a hydrogenated poly(styrene-b-isoprene/butadiene-b-styrene) (SEEPS).

17. The method of claim 15, wherein the grafted block copolymer further comprises at least one grafted amine group.

18. The method of claim 15, wherein the grafted block copolymer further comprises at least one grafted carboxyl group.

19. The method of claim 15, wherein the grafted block copolymer further comprises at least one grafted vinylsilane.

20. The method of claim 15, wherein the grafted block copolymer further comprises at least one grafted maleic anhydride.

* * * * *